(12) United States Patent
Wyatt et al.

(10) Patent No.: US 8,745,366 B2
(45) Date of Patent: Jun. 3, 2014

(54) METHOD AND APPARATUS TO SUPPORT A SELF-REFRESHING DISPLAY DEVICE COUPLED TO A GRAPHICS CONTROLLER

(75) Inventors: David Wyatt, San Jose, CA (US); Thomas E. Dewey, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 449 days.

(21) Appl. No.: 13/077,808

(22) Filed: Mar. 31, 2011

(65) Prior Publication Data
US 2012/0249563 A1    Oct. 4, 2012

(51) Int. Cl.
G06F 9/445    (2006.01)
G06F 9/44    (2006.01)

(52) U.S. Cl.
CPC ............ G06F 9/4418 (2013.01); *G06F 9/4403* (2013.01)
USPC ............................................. 713/2; 345/522

(58) Field of Classification Search
CPC .............................. G06F 9/4403; G06F 9/4418
USPC .............................................. 345/522; 713/2
See application file for complete search history.

(56) References Cited

U.S. PATENT DOCUMENTS

| | | | |
|---|---|---|---|
| 7,627,723 B1 | 12/2009 | Buck et al. | |
| 7,676,667 B2 * | 3/2010 | Kuo .................................. | 713/1 |
| 2003/0099147 A1 | 5/2003 | Deng et al. | |
| 2008/0079739 A1 | 4/2008 | Gupta et al. | |
| 2008/0126736 A1 | 5/2008 | Heil | |
| 2009/0259854 A1 | 10/2009 | Cox | |
| 2010/0146127 A1 | 6/2010 | Schmieder et al. | |
| 2010/0318725 A1 | 12/2010 | Kwon | |
| 2011/0047316 A1 | 2/2011 | Farhan et al. | |
| 2011/0143809 A1 * | 6/2011 | Salomone et al. ......... | 455/550.1 |
| 2012/0066443 A1 | 3/2012 | Li et al. | |
| 2012/0249559 A1 | 10/2012 | Khodorkovsky et al. | |

FOREIGN PATENT DOCUMENTS

EP    2515294 A2    10/2012

OTHER PUBLICATIONS

Extended European Search Report dated Sep. 30, 2013, Application No. EP12161320.2, 6 pages.
European Search Report dated Nov. 8, 2013, Application No. EP12 16 2538, 2 pages.
Non-Final Office Action for U.S. Appl. No. 13/071,408 dated May 22, 2013.

* cited by examiner

*Primary Examiner* — Albert Wang
(74) *Attorney, Agent, or Firm* — Patterson & Sheridan, LLP

(57) ABSTRACT

A method and apparatus for supporting a self-refreshing display device coupled to a graphics controller are disclosed. A technique for setting the operating state of the graphics controller during initialization from a deep sleep state is described. The graphics controller may set the operating state based on a signal that controls whether the graphics controller executes a warm-boot initialization procedure or a cold-boot initialization procedure. In the warm-boot initialization procedure, instructions and values stored in a non-volatile memory connected to the graphics controller may be used to set the operating state of the graphics controller. In one embodiment, the graphics controller may determine whether any changes have been made to the physical configuration of the computer system and, if the physical configuration has changed, the graphics controller may set the operating state based on values received from a software driver.

20 Claims, 11 Drawing Sheets

|  | eDP Lane₀ | eDP Lane₁ | eDP Lane₂ | eDP Lane₃ |
|---|---|---|---|---|
| 255(00) | BS | BS | BS | BS |
| 255(01) | VB-ID | VB-ID | VB-ID | VB-ID |
| 255(02) | Mvid7:0 | Mvid7:0 | Mvid7:0 | Mvid7:0 |
| 255(03) | Maud7:0 | Maud7:0 | Maud7:0 | Maud7:0 |
| 255(04) | . . . | . . . | . . . | . . . |
| 255(05) | BE | BE | BE | BE |
| 255(06) | P0:R[7:0] | P1:R[7:0] | P2:R[7:0] | P3:R[7:0] |
| 255(07) | P0:G[7:0] | P1:G[7:0] | P2:G[7:0] | P3:G[7:0] |
| 255(08) | P0:B[7:0] | P1:B[7:0] | P2:B[7:0] | P3:B[7:0] |
| 255(09) | P4:R[7:0] | P5:R[7:0] | P6:R[7:0] | P7:R[7:0] |
| 255(10) | P4:G[7:0] | P5:G[7:0] | P6:G[7:0] | P7:G[7:0] |
| 255(11) | P4:B[7:0] | P5:B[7:0] | P6:B[7:0] | P7:B[7:0] |
| 255(12) | . . . | . . . | . . . | . . . |
| 255(13) | PN-1:B[7:0] | PN:B[7:0] | [Padded 0s] | [Padded 0s] |
| 255(14) | BS | BS | BS | BS |
| 255(15) | VB-ID | VB-ID | VB-ID | VB-ID |
| 255(16) | Mvid7:0 | Mvid7:0 | Mvid7:0 | Mvid7:0 |
| 255(17) | Maud7:0 | Maud7:0 | Maud7:0 | Maud7:0 |
|  | 251 | 252 | 253 | 254 |

Figure 2C

| | | | | |
|---|---|---|---|---|
| 265(00) | | | | | | 
| | | | | | |
| | | | | | |
| 265(01) | SS | SS | SS | SS |
| | SB0 | SB1 | SB2 | SB3 |
| 265(02) | ⋮ | ⋮ | ⋮ | ⋮ |
| | SBN-1 | SBN | 0x00 | 0x00 |
| 265(03) | SE | SE | SE | SE |
| 265(04) | | | | |
| | | | | |
| | | | | |

METHOD AND APPARATUS TO SUPPORT A SELF-REFRESHING DISPLAY DEVICE COUPLED TO A GRAPHICS CONTROLLER

BACKGROUND OF THE INVENTION

1. Field of the Invention

The invention relates generally to display systems and, more specifically, to a method and apparatus to support a self-refreshing display device coupled to a graphics controller.

2. Description of the Related Art

Some recently designed display devices include a self-refresh capability, where the display device includes a local controller configured to generate video signals from a static, cached frame of digital video independently from the graphics controller. When in such a self-refresh mode, the video signals are driven by the local controller, thereby allowing portions of a parallel processing system, such as the graphics controller and a communications bus, to be placed in a deep sleep state to conserve power. Once in self-refresh mode, when the image to be displayed needs to be updated, control may be transitioned back to the graphics controller to allow new video signals to be generated based on a new set of pixel data.

Conventional systems are configured to initialize the various interconnected components in a serial manner. For example, the central processing unit may first cause a driver to make a call to wake-up the communications bus. An initialization routine is run to configure the communications bus. Once the communications bus is operating in a normal state, the central processing unit may then cause a driver to make a call to wake-up the graphics controller. The graphics driver then sends commands via the communications bus to the graphics controller to initialize the graphics controller.

One drawback to the above described technique is that each component of the parallel processing subsystem must be initialized in order before the next component can begin its initialization process. For example, while the communications bus is initialized, the graphics controller may sit idle waiting to receive commands over the communications bus. The described technique fails to minimize the number of clock cycles in which the graphics driver is initialized upon waking from a deep sleep state. Extended initialization routines may lead to latency in graphics updates and could be distracting to a user of the computer system when entering and exiting a panel self-refresh mode.

As the foregoing illustrates, what is needed in the art is an improved technique for waking-up the graphics controller from a deep sleep state.

SUMMARY OF THE INVENTION

One embodiment of the present invention sets forth a method for setting the operating state for a graphics processing unit coupled to a self-refreshing display device. The method includes the step of performing at least one operation to set a first portion of the operating state for the graphics processing unit. The method further includes the steps of determining whether a signal has been asserted indicating that the graphics processing unit should perform a warm-boot operation and, if the signal has been asserted, then performing the warm-boot operation to set a second portion of the operating state for the graphics processing unit or, if the signal has not been asserted, then performing a cold-boot operation to set the second portion of the operating state for the graphics processing unit.

One advantage of the disclosed technique is that minimizing the configuration time for a graphics processing unit may decrease latency associated with updating an image being displayed while the display device is operating in a panel self-refresh mode. A computer system that includes a display device having a self-refresh capability may frequently cause a graphics processing unit to enter and exit a deep sleep state. Many times, the graphics processing unit will exit the deep sleep state within a few seconds of entering the deep sleep state. Therefore, it is very unlikely that the configuration of the computer system has changed since the graphics processing unit entered the deep sleep state. The disclosed technique exploits this fact by saving and loading the operating state of the graphics processing unit rather than relying on the graphics driver to configure the graphics processing unit each time the power for the graphics processing unit is switched on.

Another advantage of the disclosed technique is that the graphics processing unit may be configured in parallel with other hardware and software components of the computer system. Utilizing an auxiliary communications path or a dedicated, non-volatile memory to load instructions used to configure the graphics processing unit relieves the graphics processing unit from being dependent on the successful initialization of a high speed communications bus, such as the PCIe bus, before the configuration of the graphics processing unit can proceed. Enabling the graphics processing unit to be configured independently reduces the time required for initialization and provides a better user experience.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2C is a conceptual diagram of digital video signals generated by a GPU for transmission over communications path, according to one embodiment of the present invention;

FIG. 2D is a conceptual diagram of a secondary data packet inserted in the horizontal blanking period of the digital video signals of FIG. 2C, according to one embodiment of the present invention;

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
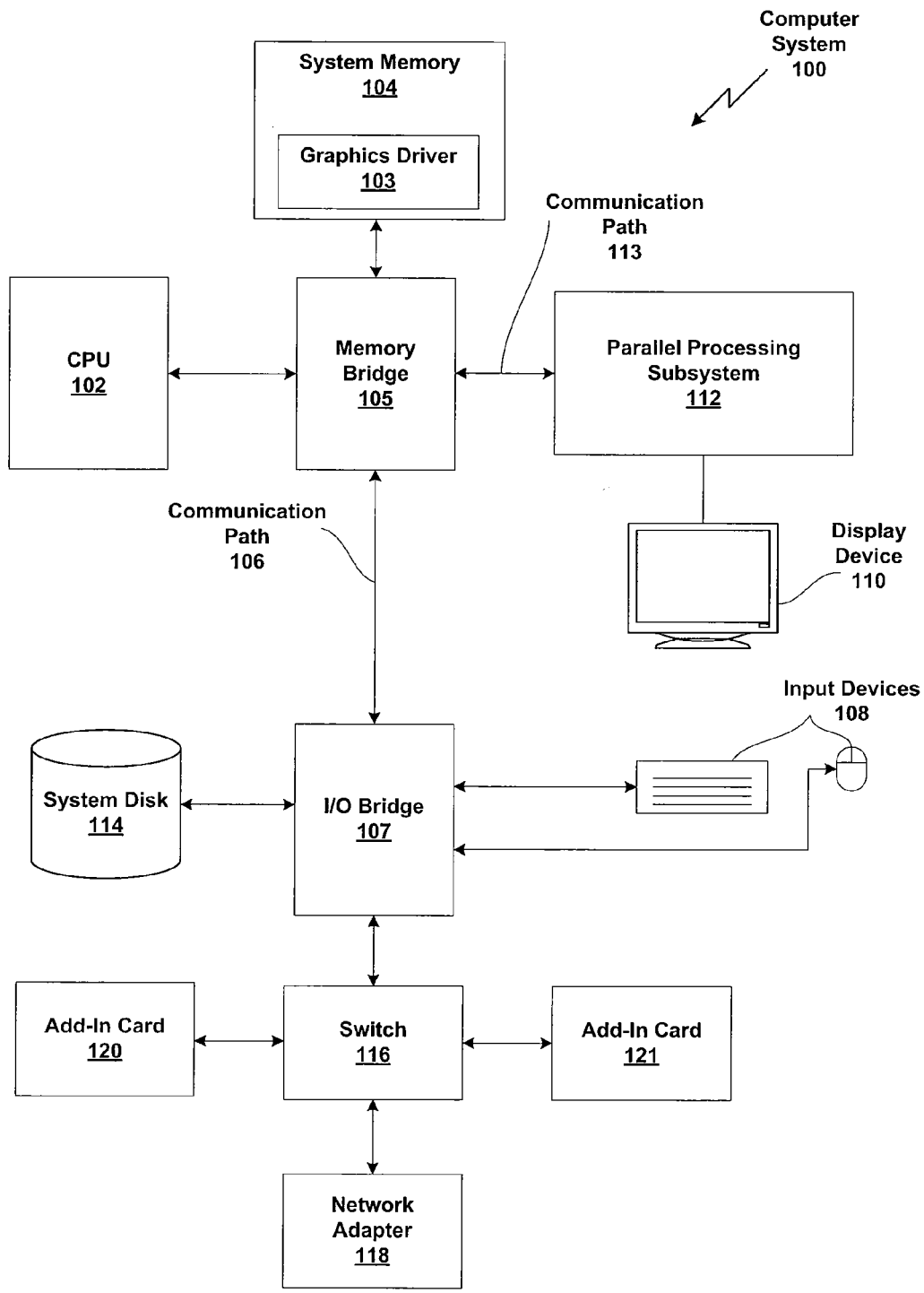
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
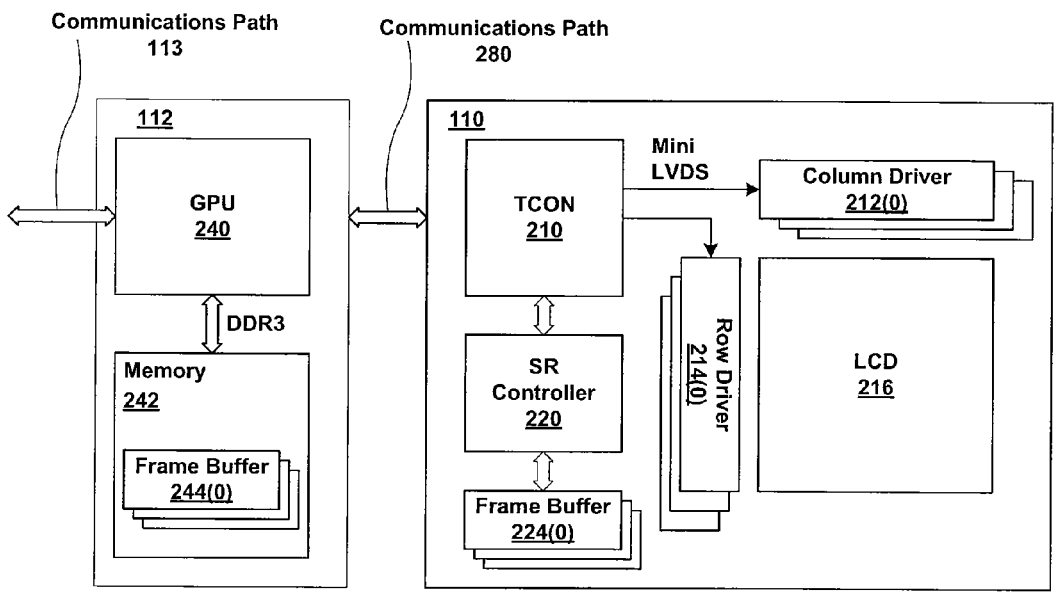
FIG. 2A illustrates a parallel processing subsystem coupled to a display device that includes a self-refreshing capability, according to one embodiment of the present invention.

FIG. 2A illustrates a parallel processing subsystem 112 coupled to a display device 110 that includes a self-refreshing capability, according to one embodiment of the present invention. As shown, parallel processing subsystem 112 includes a graphics processing unit (GPU) 240 coupled to a graphics memory 242 via a DDR3 bus interface. Graphics memory 242 includes one or more frame buffers 244(0), 244(1) . . . 244(N−1), where N is the total number of frame buffers implemented in parallel processing subsystem 112. Parallel processing subsystem 112 is configured to generate video signals based on pixel data stored in frame buffers 244 and transmit the video signals to display device 110 via communications path 280. Communications path 280 may be any video interface known in the art, such as an embedded Display Port (eDP) interface or a low voltage differential signal (LVDS) interface.

GPU 240 may be configured to receive graphics primitives from CPU 102 via communications path 113, such as a PCIe bus. GPU 240 processes the graphics primitives to produce a frame of pixel data for display on display device 110 and stores the frame of pixel data in frame buffers 244. In normal operation, GPU 240 is configured to scan out pixel data from frame buffers 244 to generate video signals for display on display device 110. In one embodiment, GPU 240 is configured to generate a digital video signal and transmit the digital video signal to display device 110 via a digital video interface such as an LVDS, DVI, HDMI, or DisplayPort (DP) interface. In another embodiment, GPU 240 may be configured to generate an analog video signal and transmit the analog video signal to display device 110 via an analog video interface such as a VGA or DVI-A interface. In embodiments where communications path 280 implements an analog video interface, display device 110 may convert the received analog video signal into a digital video signal by sampling the analog video signal with one or more analog to digital converters.

As also shown in FIG. 2A, display device 110 includes a timing controller (TCON) 210, self-refresh controller (SRC) 220, a liquid crystal display (LCD) device 216, one or more column drivers 212, one or more row drivers 214, and one or more local frame buffers 224(0), 224(1) ... 224(M−1), where M is the total number of local frame buffers implemented in display device 110. TCON 210 generates video timing signals for driving LCD device 216 via the column drivers 212 and row drivers 214. Column drivers 212, row drivers 214 and LCD device 216 may be any conventional column drivers, row drivers, and LCD device known in the art. As also shown, TCON 210 may transmit pixel data to column drivers 212 and row drivers 214 via a communication interface, such as a mini LVDS interface.

SRC 220 is configured to generate video signals for display on LCD device 216 based on pixel data stored in local frame buffers 224. In normal operation, display device 110 drives LCD device 216 based on the video signals received from parallel processing subsystem 112 over communications path 280. In contrast, when display device 110 is operating in a panel self-refresh mode, display device 110 drives LCD device 216 based on the video signals received from SRC 220.

GPU 240 may be configured to manage the transition of display device 110 into and out of a panel self-refresh mode. Ideally, the overall power consumption of computer system 100 may be reduced by operating display device 110 in a panel self-refresh mode during periods of graphical inactivity in the image displayed by display device 110. In one embodiment, to cause display device 110 to enter a panel self-refresh mode, GPU 240 may transmit a message to display device 110 using an in-band signaling method, such as by embedding a message in the digital video signals transmitted over communications path 280. In alternative embodiments, GPU 240 may transmit the message using a side-band signaling method, such as by transmitting the message using an auxiliary communications channel. Various signaling methods for signaling display device 110 to enter or exit a panel self-refresh mode are described below in conjunction with FIGS. 2B-2D.

Returning now to FIG. 2A, after receiving the message to enter the self-refresh mode, display device 110 caches the next frame of pixel data received over communications path 280 in local frame buffers 224. Display device 110 transitions control for driving LCD device 216 from the video signals generated by GPU 240 to video signals generated by SRC 220 based on the pixel data stored in local frame buffers 224. While the display device 110 is in the panel self-refresh mode, SRC 220 continuously generates repeating video signals representing the cached pixel data stored in local frame buffers 224 for one or more consecutive video frames.

In order to cause display device 110 to exit the panel self-refresh mode, GPU 240 may transmit a similar message to display device 110 using a similar method as that described above in connection with causing display device 110 to enter the panel self-refresh mode. After receiving the message to exit the panel self-refresh mode, display device 110 may be configured to ensure that the pixel locations associated with the video signals generated by GPU 240 are aligned with the pixel locations associated with the video signals generated by SRC 220 currently being used to drive LCD device 216 in the panel self-refresh mode. Once the pixel locations are aligned, display device may transition control for driving LCD device 216 from the video signals generated by SRC 220 to the video signals generated by GPU 240.

The amount of storage required to implement a self-refresh capability may be dependent on the size of the uncompressed frame of video used to continuously refresh the image on the display device 110. In one embodiment, display device 110 includes a single local frame buffer 224(0) that is sized to accommodate an uncompressed frame of pixel data for display on LCD device 216. The size of frame buffer 224(0) may be based on the minimum number of bytes required to store an uncompressed frame of pixel data for display on LCD device 216, calculated as the result of multiplying the width by the height by the color depth of the native resolution of LCD device 216. For example, frame buffer 224(0) could be sized for an LCD device 216 configured with a WUXGA resolution (1920×1200 pixels) and a color depth of 24 bits per pixel (bpp). In this case, the amount of storage in local frame buffer 224(0) available for self-refresh pixel data caching should be at least 6750 kB of addressable memory (1920*1200*24 bpp; where 1 kilobyte is equal to 1024 or $2^{10}$ bytes).

In another embodiment, local frame buffer 224(0) may be of a size that is less than the number of bytes required to store an uncompressed frame of pixel data for display on LCD device 216. In such a case, the uncompressed frame of pixel data may be compressed by SRC 220, such as by run length encoding the uncompressed pixel data, and stored in frame buffer 224(0) as compressed pixel data. In such embodiments, SRC 220 may be configured to decode the compressed pixel data before generating the video signals used to drive LCD device 216. In yet other embodiments, GPU 240 may compress the frame of pixel data prior to encoding the compressed pixel data in the digital video signals transmitted to display device 110. For example, GPU 240 may be configured to encode the pixel data using an MPEG-2 format. In such embodiments, SRC 220 may store the compressed pixel data in local frame buffer 224(0) in the compressed format and decode the compressed pixel data before generating the video signals used to drive LCD device 216.

Display device 110 may be capable of displaying 3D video data, such as stereoscopic video data. Stereoscopic video data includes a left view and a right view of uncompressed pixel data for each frame of 3D video. Each view corresponds to a different camera position of the same scene captured approximately simultaneously. Some display devices are capable of displaying three or more views simultaneously, such as in some types of auto-stereoscopic displays.

In one embodiment, display device 110 may include a self-refresh capability in connection with stereoscopic video data. Each frame of stereoscopic video data includes two uncompressed frames of pixel data for display on LCD device 216. Each of the uncompressed frames of pixel data may be comprised of pixel data at the full resolution and color depth of LCD device 216. In such embodiments, local frame buffer 224(0) may be sized to hold one frame of stereoscopic video data. For example, to store uncompressed stereoscopic video data at WUXGA resolution and 24 bpp color depth, the size of local frame buffer 224(0) should be at least 13500 kB of addressable memory (2*1920*1200*24 bpp). Alternatively, local frame buffers 224 may include two frame buffers 224(0) and 224(1), each sized to store a single view of uncompressed pixel data for display on LCD device 216.

In yet other embodiments, SRC 220 may be configured to compress the stereoscopic video data and store the compressed stereoscopic video data in local frame buffers 224. For example, SRC 220 may compress the stereoscopic video data using Multiview Video Coding (MVC) as specified in the H.264/MPEG-4 AVC video compression standard. Alternatively, GPU 240 may compress the stereoscopic video data prior to encoding the compressed video data in the digital video signals for transmission to display device 110.

In one embodiment, display device 110 may include a dithering capability. Dithering allows display device 110 to display more perceived colors than the hardware of LCD device 216 is capable of displaying. Temporal dithering alternates the color of a pixel rapidly between two approximate colors in the available color palette of LCD device 216 such that the pixel is perceived as a different color not included in the available color palette of LCD device 216. For example, by alternating a pixel rapidly between white and black, a viewer may perceive the color gray. In a normal operating state, GPU 240 may be configured to alternate pixel data in successive frames of video such that the perceived colors in the image displayed by display device 110 are outside of the available color palette of LCD device 216. In a self-refresh mode, display device 110 may be configured to cache two successive frames of pixel data in local frame buffers 224. Then, SRC 220 may be configured to scan out the two frames of pixel data from local frame buffers 224 in an alternating fashion to generate the video signals for display on LCD device 216.

Figure 2B:
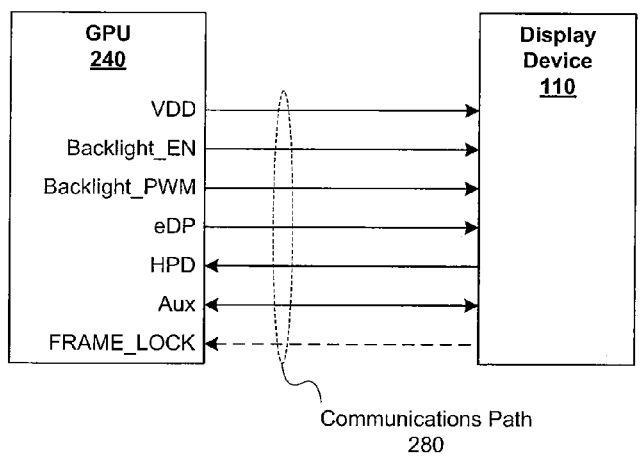
FIG. 2B illustrates a communications path that implements an embedded DisplayPort interface, according to one embodiment of the present invention.

FIG. 2B illustrates a communications path 280 that implements an embedded DisplayPort interface, according to one embodiment of the present invention. Embedded DisplayPort (eDP) is a standard digital video interface for internal display devices, such as an internal LCD device in a laptop computer. Communications path 280 includes a main link (eDP) that includes 1, 2 or 4 differential pairs (lanes) for high bandwidth data transmission. The eDP interface also includes a panel enable signal (VDD), a backlight enable signal (Backlight_EN), a backlight pwm signal (Backlight_PWM), and a hot-plug detect signal (HPD) as well as a single differential pair auxiliary channel (Aux). The main link is a unidirectional communication channel from GPU 240 to display device 110. In one embodiment, GPU 240 may be configured to transmit video signals generated from pixel data stored in frame buffers 244 over a single lane of the eDP main link. In alternative embodiments, GPU 240 may be configured to transmit the video signals over 2 or 4 lanes of the eDP main link.

The panel enable signal VDD may be connected from GPU to the display device 110 to turn on power in display device 110. The backlight enable and backlight pwm signals control the intensity of the backlight in display device 110 during normal operation. However, when the display device 110 is operating in a panel self-refresh mode, control for these signals must be handled by TCON 210 and may be changed by SRC 220 via control signals received over the auxiliary communication channel (Aux). One of skill in the art will recognize that the intensity of the backlight may be controlled by pulse width modulating a signal via the backlight pwm signal (Backlight_PWM). In some embodiments, communications path 280 may also include a frame lock signal (FRAME_LOCK) that indicates a vertical sync in the video signals generated by SRC 220. The FRAME_LOCK signal may be used to resynchronize the video signals generated by GPU 240 with the video signals generated by SRC 220.

The hot-plug detect signal, HPD, may be a signal connected from the display device 110 to GPU 240 for detecting a hot-plug event or for communicating an interrupt request from display device 110 to GPU 240. To indicate a hot-plug event, display device drives HPD high to indicate that a display device has been connected to communications path 280. After display device is connected to communications path 280, display device 110 may signal an interrupt request by quickly pulsing the HPD signal low for between 0.5 and 1 millisecond.

The auxiliary channel, Aux, is a low bandwidth, bidirectional half-duplex data communication channel used for transmitting command and control signals from GPU 240 to display device 110 as well as from display device 110 to GPU 240. In one embodiment, messages indicating that display device 110 should enter or exit a panel self-refresh mode may be communicated over the auxiliary channel. On the auxiliary channel, GPU 240 is a master device and display device 110 is a slave device. In such a configuration, data or messages may be sent from display device 110 to GPU 240 using the following technique. First, display device 110 indicates to GPU 240 that display device 110 would like to send traffic over the auxiliary channel by initiating an interrupt request over the hot-plug detect signal, HPD. When GPU 240 detects an interrupt request, GPU 240 sends a transaction request message to display device 110. Once display device 110 receives the transaction request message, display device 110 then responds with an acknowledgement message. Once GPU 240 receives the acknowledgement message, GPU 240 may read one or more register values in display device 110 to retrieve the data or messages over the auxiliary channel.

It will be appreciated by those of skill in the art that communications path 280 may implement a different video interface for transmitting video signals between GPU 240 and display device 110. For example, communications path 280 may implement a high definition multimedia interface (HDMI) or a low voltage differential signal (LVDS) video interface such as open-LDI. The scope of the invention is not limited to an Embedded DisplayPort video interface.

FIG. 2C is a conceptual diagram of digital video signals 250 generated by a GPU 240 for transmission over communications path 280, according to one embodiment of the present invention. As shown, digital video signals 250 is formatted for transmission over four lanes (251, 252, 253 and 254) of the main link of an eDP video interface. The main link of the eDP video interface may operate at one of three link symbol clock rates, as specified by the eDP specification (162 MHz, 270 MHz or 540 MHz). In one embodiment, GPU 240 sets the link symbol clock rate based on a link training operation that is performed to configure the main link when a display device 110 is connected to communications path 280. For each link symbol clock cycle 255, a 10-bit symbol, which encodes one byte of data or control information using 8b/10b encoding, is transmitted on each active lane of the eDP interface.

The format of digital video signals 250 enables secondary data packets to be inserted directly into the digital video signals 250 transmitted to display device 110. In one embodiment, the secondary data packets may include messages sent from GPU 240 to display device 110 that request display device 110 to enter or exit a panel self-refresh mode. Such secondary data packets enable one or more aspects of the invention to be realized over the existing physical layer of the eDP interface. It will be appreciated that this form of in-line signaling may be implemented in other packet based video interfaces and is not limited to embodiments implementing an eDP interface.

Secondary data packets may be inserted into digital video signals 250 during the vertical or horizontal blanking periods of the video frame represented by digital video signals 250. As shown in FIG. 2C, digital video signals 250 are packed one horizontal line of pixel data at a time. For each horizontal line of pixel data, the digital video signals 250 include a blanking start (BS) framing symbol during a first link clock cycle 255(00) and a corresponding blanking end (BE) framing symbol during a subsequent link clock cycle 255(05). The portion of digital video signals 250 between the BS symbol at link symbol clock cycle 255(00) and the BE symbol at link symbol clock cycle 255(5) corresponds to the horizontal blanking period.

Control symbols and secondary data packets may be inserted into digital video signals 250 during the horizontal blanking period. For example, a VB-ID symbol is inserted in the first link symbol clock cycle 255(01) after the BS symbol.

The VB-ID symbol provides display device 110 with information such as whether the main video stream is in the vertical blanking period or the vertical display period, whether the main video stream is interlaced or progressive scan, and whether the main video stream is in the even field or odd field for interlaced video. Immediately following the VB-ID symbol, a video time stamp (Mvid7:0) and an audio time stamp (Maud7:0) are inserted at link symbol clock cycles 255(02) and 255(03), respectively. Dummy symbols may be inserted during the remainder of the link symbol clock cycles 255(04) during the horizontal blanking period. Dummy symbols may be a special reserved symbol indicating that the data in that lane during that link symbol clock cycle is dummy data. Link symbol clock cycles 255(04) may have a duration of a number of link symbol clock cycles such that the frame rate of digital video signals 250 over communications path 280 is equal to the refresh rate of display device 110.

A secondary data packet may be inserted into digital video signals 250 by replacing a plurality of dummy symbols during link symbol clock cycles 255(04) with the secondary data packet. A secondary data packet is framed by the special secondary start (SS) and secondary end (SE) framing symbols. Secondary data packets may include an audio data packet, link configuration information, or a message requesting display device 110 to enter or exit a panel self-refresh mode.

The BE framing symbol is inserted in digital video signals 250 to indicate the start of active pixel data for a horizontal line of the current video frame. As shown, pixel data P0 ... PN has a RGB format with a per channel bit depth (bpc) of 8-bits. Pixel data P0 associated with the first pixel of the horizontal line of video is packed into the first lane 251 at link symbol clock cycles 255(06) through 255(08) immediately following the BE symbol. A first portion of pixel data P0 associated with the red color channel is inserted into the first lane 251 at link symbol clock cycle 255(06), a second portion of pixel data P0 associated with the green color channel is inserted into the first lane 251 at link symbol clock cycle 255(07), and a third portion of pixel data P0 associated with the blue color channel is inserted into the first lane 251 at link symbol clock cycle 255(08). Pixel data P1 associated with the second pixel of the horizontal line of video is packed into the second lane 252 at link symbol clock cycles 255(06) through 255(08), pixel data P2 associated with the third pixel of the horizontal line of video is packed into the third lane 253 at link symbol clock cycles 255(06) through 255(08), and pixel data P3 associated with the fourth pixel of the horizontal line of video is packed into the fourth lane 254 at link symbol clock cycles 255(06) through 255(08). Subsequent pixel data of the horizontal line of video are inserted into the lanes 251-254 in a similar fashion to pixel data P0 through P3. In the last link symbol clock cycle to include valid pixel data, any unfilled lanes may be padded with zeros. As shown, the third lane 253 and the fourth lane 254 are padded with zeros at link symbol clock cycle 255(13).

The sequence of data described above repeats for each horizontal line of pixel data in the frame of video, starting with the top most horizontal line of pixel data. A frame of video may include a number of horizontal lines at the top of the frame that do not include active pixel data for display on display device 110. These horizontal lines comprise the vertical blanking period and may be indicated in digital video signals 250 by setting a bit in the VB-ID control symbol.

FIG. 2D is a conceptual diagram of a secondary data packet 260 inserted in the horizontal blanking period of the digital video signals 250 of FIG. 2C, according to one embodiment of the present invention. A secondary data packet 260 may be inserted into digital video signals 250 by replacing a portion of the plurality of dummy symbols in digital video signals 250. For example, FIG. 2D shows a plurality of dummy symbols at link symbol clock cycles 265(00) and 265(04). GPU 240 may insert a secondary start (SS) framing symbol at link symbol clock cycle 265(01) to indicate the start of a secondary data packet 260. The data associated with the secondary data packet 260 is inserted at link symbol clock cycles 265(02). Each byte of the data (SB0 ... SBN) associated with the secondary data packet 260 is inserted in one of the lanes 251-254 of digital video signals 250. Any slots not filled with data may be padded with zeros. GPU 240 then inserts a secondary end (SE) framing symbol at link symbol clock cycle 265(03).

In one embodiment, the secondary data packet 260 may include a header and data indicating that the display device 110 should enter or exit a self-refresh mode. For example, the secondary data packet 260 may include a reserved header code that indicates that the packet is a panel self-refresh packet. The secondary data packet may also include data that indicates whether display device 110 should enter or exit a panel self-refresh mode.

As described above, GPU 240 may send messages to display device 110 via an in-band signaling method, using the existing communications channel for transmitting digital video signals 250 to display device 110. In alternative embodiments, GPU 240 may send messages to display device 110 via a side-band method, such as by using the auxiliary communications channel in communications path 280. In yet other embodiments, a dedicated communications path, such as an additional cable, may be included to provide signaling to display device 110 to enter or exit the panel self-refresh mode.

Figure 3:
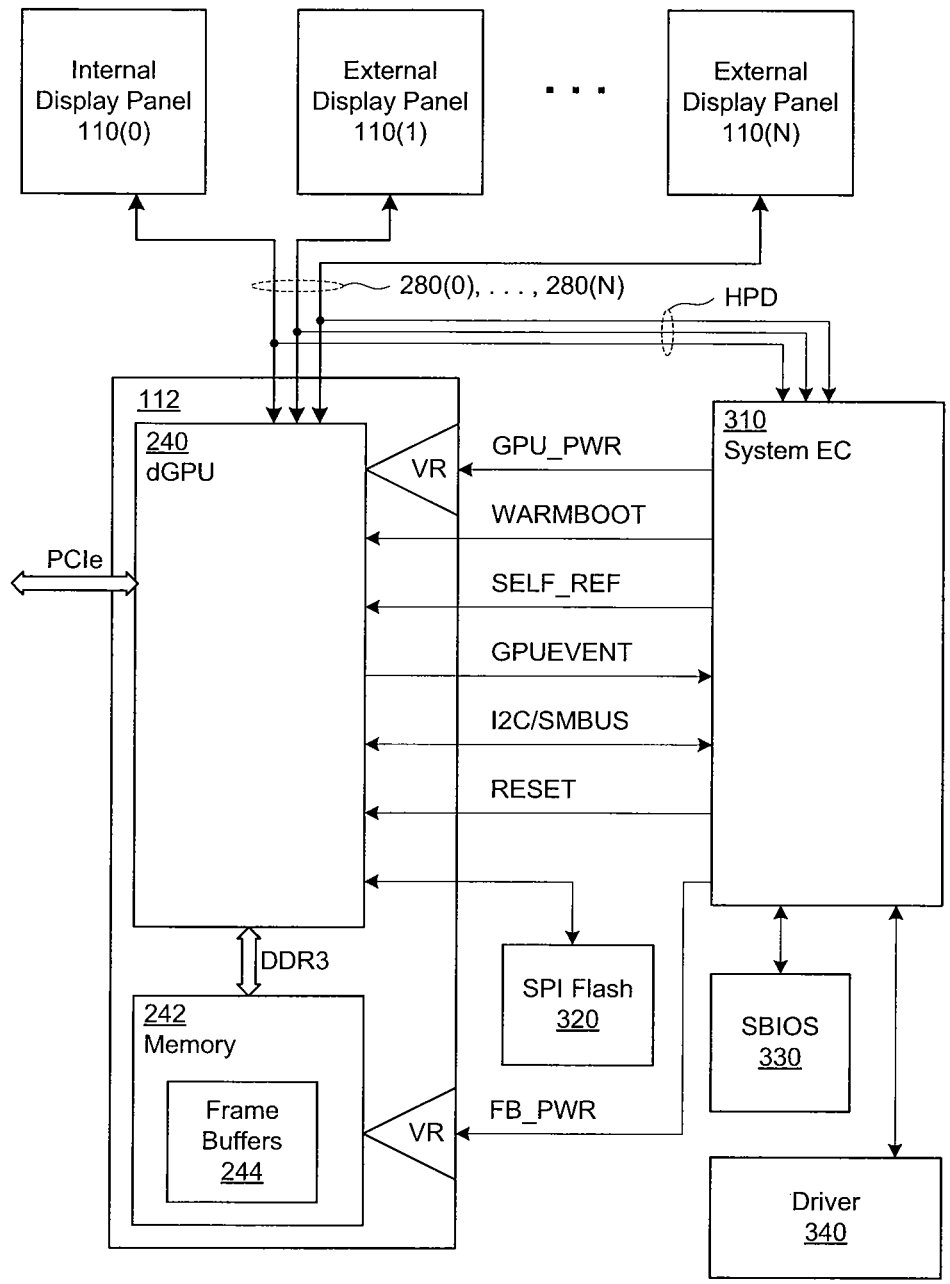
FIG. 3 illustrates communication signals between parallel processing subsystem and various components of computer system, according to one embodiment of the present invention.

FIG. 3 illustrates communication signals between parallel processing subsystem 112 and various components of computer system 100, according to one embodiment of the present invention. As shown, computer system 100 includes an embedded controller (EC) 310, an SPI flash device 320, a system basic input/output system (SBIOS) 330, and a driver 340. EC 310 may be an embedded controller that implements an advanced configuration and power interface (ACPI) that allows an operating system executing on CPU 102 to configure and control the power management of various components of computer system 100. In one embodiment, EC 310 allows the operating system executing on CPU 102 to communicate with GPU 240 via driver 340 even when the PCIe bus is down. For example, if GPU 240 and the PCIe bus are shut down in a power saving mode, the operating system executing on CPU 102 may instruct EC 310 to wake-up GPU 240 by sending a notify ACPI event to EC 310 via driver 340.

Computer system 100 may also include multiple display devices 110 such as an internal display panel 110(0) and one or more external display panels 110(1) ... 110(N). Each of the one or more display devices 110 may be connected to GPU 240 via communication paths 280(0) ... 280(N). In one embodiment, each of the HPD signals included in communication paths 280 are also connected to EC 310. When one or more display devices 110 are operating in a panel self-refresh mode, EC 310 may be responsible for monitoring HPD and waking-up GPU 240 if EC 310 detects a hot-plug event or an interrupt request from one of the display devices 110.

In one embodiment, a FRAME_LOCK signal is included between internal display device 110(0) and GPU 240. FRAME_LOCK passes a synchronization signal from the display device 110(0) to GPU 240. For example, GPU 240 may synchronize video signals generated from pixel data in frame buffers 244 with the FRAME_LOCK signal. FRAME_LOCK may indicate the start of the active frame such as by passing the vertical sync signal used by ICON 210 to drive LCD device 216 to GPU 240.

EC 310 transmits the GPU_PWR and FB_PWR signals to voltage regulators that provide a supply voltage to the GPU 240 and frame buffers 244, respectively. EC 310 also transmits the WARMBOOT, SELF_REF and RESET signals to GPU 240 and receives a GPUEVENT signal from GPU 240. Finally, EC 310 may communicate with GPU 240 via an I2C or SMBus data bus. The functionality of these signals is described below.

The GPU_PWR signal controls the voltage regulator that provides GPU 240 with a supply voltage. When display device 110 enters a self-refresh mode, an operating system executing on CPU 102 may instruct EC 310 to kill power to GPU 240 by making a call to driver 340. Driver 340 will then drive the GPU_PWR signal low to kill power to GPU 240 to reduce the overall power consumption of computer system 100. Similarly, the FB_PWR signal controls the voltage regulator that provides frame buffers 244 with a supply voltage. When display device 110 enters the self-refresh mode, computer system 100 may also kill power to frame buffers 244 in order to further reduce overall power consumption of computer system 100. The FB_PWR signal is controlled in a similar manner to the GPU_PWR signal. The RESET signal may be asserted during wake-up of the GPU 240 to hold GPU 240 in a reset state while the voltage regulators that provide power to GPU 240 and frame buffers 244 are allowed to stabilize.

The WARMBOOT signal is asserted by EC 310 to indicate that GPU 240 should restore an operating state from SPI flash device 320 instead of performing a full, cold-boot sequence. In one embodiment, when display device 110 enters a panel self-refresh mode, GPU 240 may be configured to save a current state in SPI flash device 320 before GPU 240 is powered down. GPU 240 may then restore an operating state by loading the saved state information from SPI flash device 320 upon waking-up. Loading the saved state information reduces the time required to wake-up GPU 240 relative to performing a full, cold-boot sequence. Reducing the time required to wake-up GPU 240 is advantageous during high frequency entry and exit into a panel self-refresh mode.

The SELF_REF signal is asserted by EC 310 when display device 110 is operating in a panel self-refresh mode. The SELF_REF signal indicates to GPU 240 that display device 110 is currently operating in a panel self-refresh mode and that communications path 280 should be isolated to prevent transients from disrupting the data stored in local frame buffers 224. In one embodiment, GPU 240 may connect communications path 280 to ground through weak, pull-down resistors when the SELF_REF signal is asserted.

The GPUEVENT signal allows the GPU 240 to indicate to CPU 102 that an event has occurred, even when the PCIe bus is off. GPU 240 may assert the GPUEVENT to alert system EC 310 to configure the I2C/SMBUS to enable communication between the GPU 240 and the system EC 310. The I2C/SMBUS is a bidirectional communication bus configured as an I2C, SMBUS, or other bidirectional communication bus to enable GPU 240 and system EC 310 to communicate. In one embodiment, the PCIe bus may be shut down when display device 110 is operating in a panel self-refresh mode. The operating system may notify GPU 240 of events, such as cursor updates or a screen refresh, through system EC 310 even when the PCIe bus is shut down.

Figure 4:
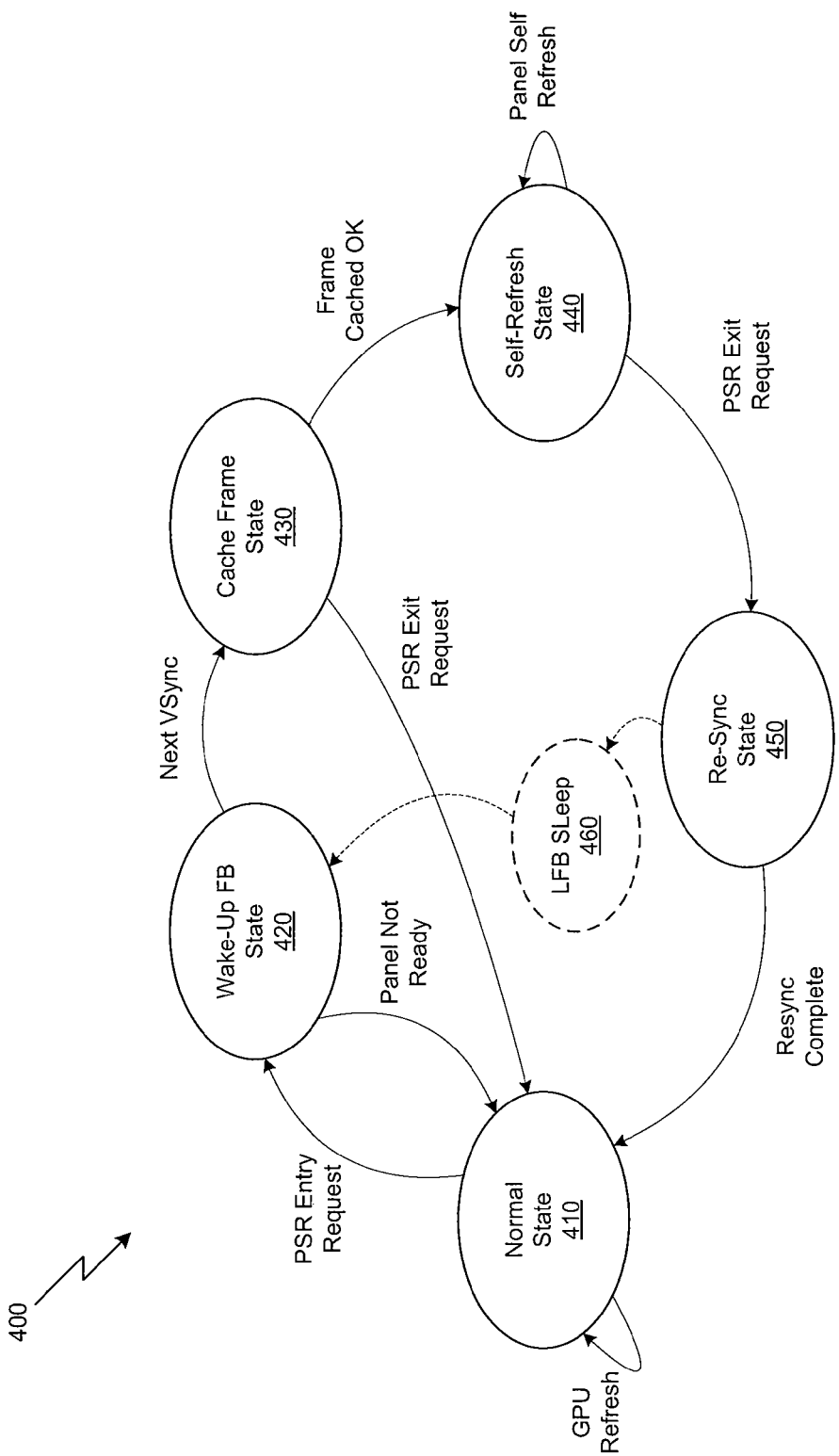
FIG. 4 is a state diagram for a display device having a self-refreshing capability, according to one embodiment of the present invention.

FIG. 4 is a state diagram 400 for a display device 110 having a self-refreshing capability, according to one embodiment of the present invention. As shown, display device 110 begins in a normal state 410. In the normal state 410, display device receives video signals from GPU 240. TCON 210 drives the LCD device 216 using the video signals received from GPU 240. In the normal operating state, display device 110 monitors communications path 280 to determine if GPU 240 has issued a panel self-refresh entry request. If display device 110 receives the panel self-refresh entry request, then display device 110 transitions to a wake-up frame buffer state 420.

In the wake-up frame buffer state 420, display device 110 wakes-up the local frame buffers 224. If display device 110 cannot initialize the local frame buffers 224, then display device 110 may send an interrupt request to GPU 240 indicating that the display device 110 has failed to enter the panel self-refresh mode and display device 110 returns to normal state 410. In one embodiment, display device 110 may be required to initialize the local frame buffers 224 before the next frame of video is received over communications path 280 (i.e., before the next rising edge of the VSync signal generated by GPU 240). Once display device 110 has completed initializing local frame buffers 224, display device 110 transitions to a cache frame state 430.

In the cache frame state 430, display device 110 waits for the next falling edge of the VSync signal generated by GPU 240 to begin caching one or more frames of video in local frame buffers 224. In one embodiment, GPU 240 may indicate how many consecutive frames of video to store in local frame buffers 224 by writing a value to a control register in display device 110. After display device has stored the one or more frames of video in local frame buffers 224, display device 110 transitions to a self-refresh state 440.

In the self-refresh state 440, the display device 110 enters a panel self-refresh mode where TCON 210 drives the LCD device 216 with video signals generated by SRC 220 based on pixel data stored in local frame buffers 224. Display device 110 stops driving the LCD device 216 based on the video signals generated by GPU 240. Consequently, GPU 240 and communications path 280 may be placed in a power saving mode to reduce the overall power consumption of computer system 100. While in the self-refresh state 440, display device 110 may monitor communications path 280 to detect a request from GPU 240 to exit the panel self-refresh mode. If display device 110 receives a panel self-refresh exit request, then display device 110 transitions to a re-sync state 450.

In the re-sync state 450, display device 110 attempts to re-synchronize the video signals generated by GPU 240 with the video signals generated by SRC 220. Various techniques for re-synchronizing the video signals are described below in conjunction with FIGS. 9A-9C and 10-13. When display device 110 has completed re-synchronizing the video signals, then display device 110 transitions back to a normal state 410. In one embodiment, display device 110 will cause the local frame buffers 224 to transition into a local frame buffer sleep state 460, where power supplied to the local frame buffers 224 is turned off.

In one embodiment, display device 110 may be configured to quickly exit wake-up frame buffer state 420 and cache frame state 430 if display device 110 receives an exit panel self-refresh exit request. In both of these states, display device 110 is still synchronized with the video signals generated by GPU 240. Thus, display device 110 may transition quickly back to normal state 410 without entering re-sync state 450. Once display device 110 is in self-refresh state 440, display device 110 is required to enter re-sync state 450 before returning to normal state 410.

Figure 5:
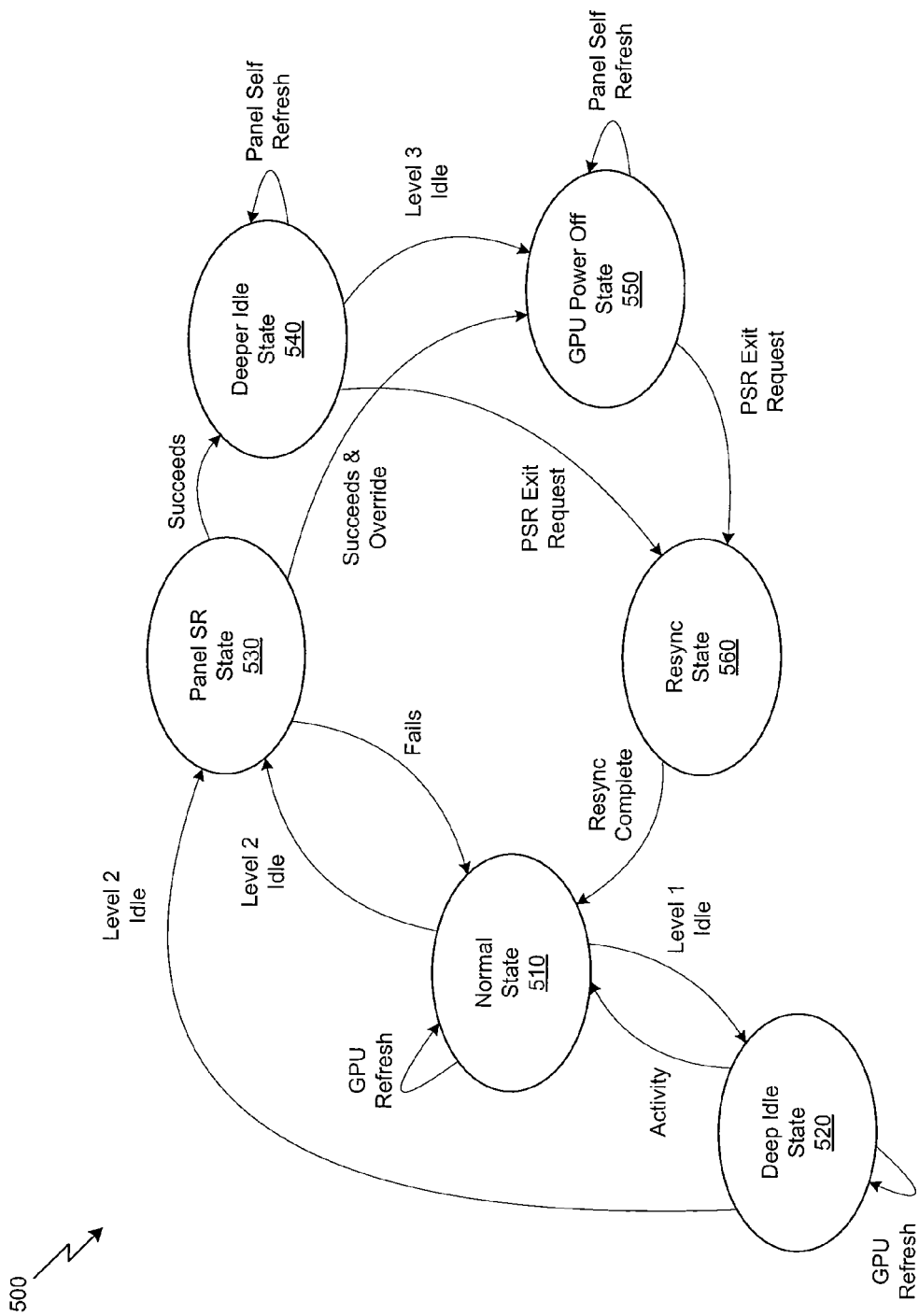
FIG. 5 is a state diagram for a graphics processing unit configured to control the transition of a display device into and out of a panel self-refresh mode, according to one embodiment of the present invention.

FIG. 5 is a state diagram 500 for a GPU 240 configured to control the transition of a display device 110 into and out of a panel self-refresh mode, according to one embodiment of the present invention. After initial configuration from a cold-boot sequence, GPU 240 enters a normal state 510. In the normal state, GPU 240 generates video signals for transmission to display device 110 based on pixel data stored in frame buffers 244. In one embodiment, GPU 240 monitors pixel data in frame buffers 244 to detect one or more progressive levels of idleness in the pixel data. For example, GPU 240 may compare the current frame of pixel data in frame buffers 244 with the previous frame of pixel data in frame buffers 244 to detect any graphical activity in the pixel data. Graphical activity may be detected if the pixel data is different between the two frames. In alternative embodiments, GPU 240 may detect progressive levels of idleness based on a factor other than the comparison of consecutive frames of pixel data in frame buffers 244. If GPU 240 fails to detect any graphical activity in the pixel data stored in frame buffers 244, then GPU 240 may increment a counter that indicates the number of consecutive frames of video without any graphical activity. If the counter reaches a first threshold value, then GPU 240 transitions to a deep-idle state 520.

In the deep-idle state 520, GPU 240 still generates video signals for display on display device 110. However, GPU 240 operates in a power saving mode, such as by clock-gating or power-gating certain processing portions of GPU 240 while keeping the portions of GPU 240 responsible for generating the video signals active. Additionally, GPU 240 may send a message to display device 110 requesting display device 110 to drive LCD device 216 at a lower refresh rate. For example, GPU 240 may request display device 110 to reduce the refresh rate from 75 Hz to 30 Hz, and GPU 240 may generate and transmit video signals based on the lower refresh rate. While operating in deep-idle state 520, GPU 240 may continue to monitor pixel data in frame buffers 244 for graphical activity. If GPU 240 detects graphical activity, GPU 240 transitions back to normal state 510. Returning to deep-idle state 520, GPU 240 may continue to increment the counter to determine the number of consecutive frames of video without any graphical activity. If the counter reaches a second threshold value, that is greater than the first threshold value, then GPU 240 transitions to a panel self-refresh state 530.

In some embodiments, the state diagram 500 does not include the deep-idle state 520. In such embodiments, GPU 240 may transition directly from the normal state 510 to the panel self-refresh state 530 when the counter reaches the second threshold value. In yet other embodiments, EC 310, graphics driver 103, or some other dedicated monitoring unit, may perform the monitoring of the pixel data in frame buffers 244 and send a message to GPU 240 over the I2C/SMBUS indicating that one of the progressive levels of idleness has been detected.

In the panel self-refresh state 530, GPU 240 transmits the one or more video frames for display during the panel self-refresh mode to display device 110. GPU 240 may monitor communications path 280 to detect a failure by display device 110 in entering self-refresh mode. In one embodiment, GPU 240 monitors the HPD signal to detect an interrupt request issued by display device 110. If GPU 240 detects an interrupt request from display device 110, then GPU 240 may configure the Auxiliary channel of communications path 280 to receive communications from display device 110. If display device 110 indicates that entry into self-refresh mode did not succeed, then GPU 240 may transition back to normal state 510. Otherwise, GPU 240 transitions to a deeper-idle state 540. In another embodiment, GPU 240 may override the transition into the deeper idle state 540 and transition directly into GPU power off state 550. In such embodiments, the GPU 240 will be completely shut down whenever display device 110 enters a panel self-refresh mode.

In the deeper-idle state 540, GPU 240 may be placed in a sleep state and the transmitter side of communications path 280 may be shut down. Portions of GPU 240 may be clock-gated or power-gated in order to reduce the overall power consumption of computer system 100. Display device 110 is responsible for refreshing the image displayed by display device 110. In one embodiment, GPU 240 may continue to monitor the pixel data in frame buffers 244 to detect a third level of idleness. For example, GPU 240 may continue to increment a counter for each frame of video where GPU 240 fails to update the pixel data in frame buffers 244. If GPU 240 detects graphical activity, such as by receiving a signal from EC 310 over the I2C/SMBUS or from graphics driver 103 over the PCIe bus, then GPU 240 transitions to the re-sync state 560. In contrast, if GPU 240 detects a third level of idleness in the pixel data, then GPU 240 transitions to a GPU power-off state 550.

In the GPU power-off state 550, EC 310 shuts down GPU 240 by turning off the voltage regulator supplying power to GPU 240. EC 310 may drive the GPU_PWR signal low to shut down the voltage regulator supplying GPU 240. In one embodiment, GPU 240 may save the current operating context in SPI flash device 320 in order to perform a warm-boot sequence on wake-up. In GPU power off state 550, a voltage regulator supplying power to graphics memory 242 may also be turned off. EC 310 may drive the FB_PWR signal low to shut down the voltage regulator supplying graphics memory 242.

When GPU 240 is in either the deeper-idle state 540 or the GPU power-off state 550, GPU 240 may be instructed to wake-up by EC 310 to update the image being displayed on display device 110. For example, a user of computer system 100 may begin typing into an application that requires GPU 240 to update the image displayed on the display device. In one embodiment, driver 340 may instruct EC 310 to assert the GPU_PWR and FB_PWR signals to turn on the voltage regulators supplying GPU 240 and frame buffers 244. When GPU 240 is turned on, GPU 240 will perform a boot sequence based on the status of the WARMBOOT signal and the RESET signal. If EC 310 asserts the WARM_BOOT signal, then GPU 240 may load a stored context from the SPI flash device 320. Otherwise GPU 240 may perform a cold-boot sequence. GPU 240 may also configure the transmitter side of communications path 280 based on information stored in SPI flash device 320. After GPU 240 has performed the boot sequence, GPU 240 may send a panel self-refresh exit request to display device 110. GPU 240 then transitions to a re-sync state 560.

In the re-sync state 560, GPU 240 begins generating video signals based on pixel data stored in frame buffers 244. The video signals are transmitted to display device 110 over communications path 280 and display device 110 attempts to re-synchronize the video signals generated by GPU 240 with the video signals generated by SRC 220. After re-synchronizing the video signals is complete, GPU 240 transitions back to the normal state 510.

GPU Initialization Routine

Figure 6:
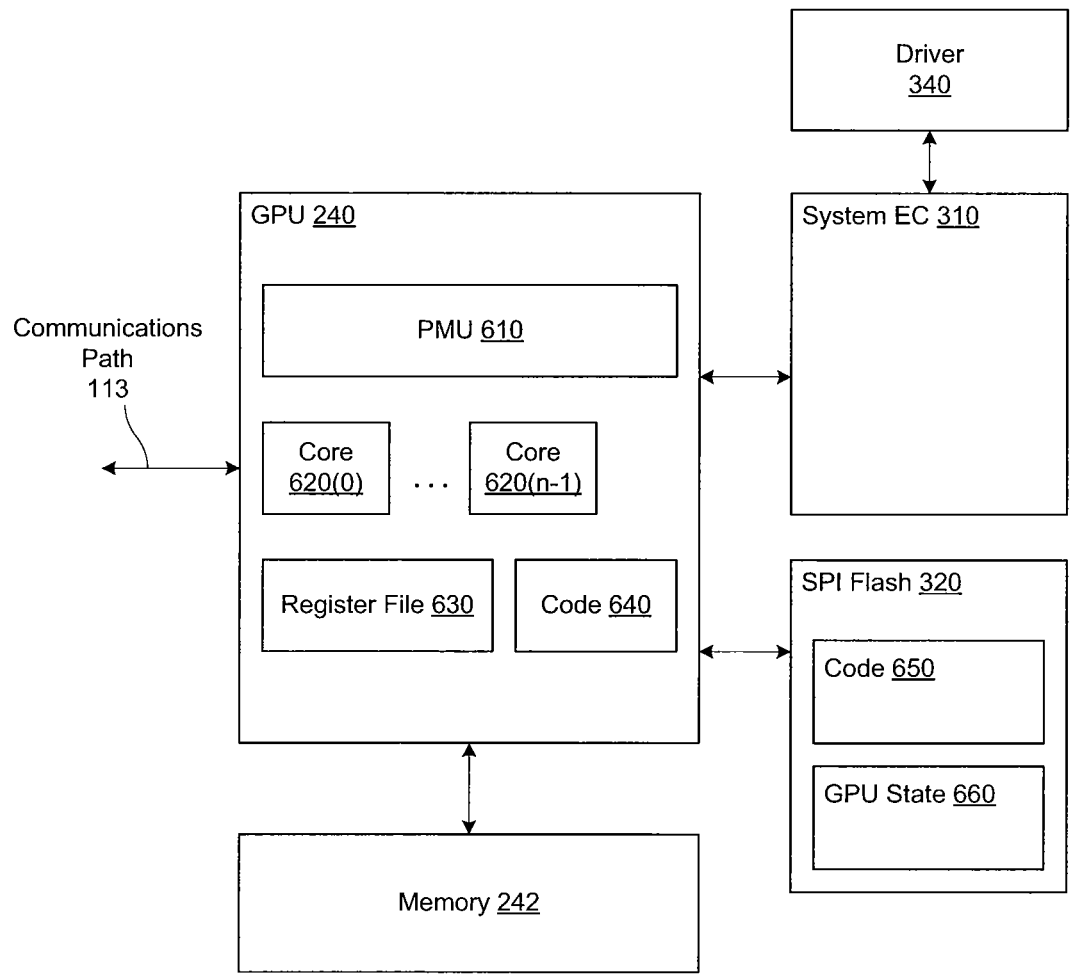
FIG. 6 illustrates various components of a graphics processing unit, according to one embodiment of the present invention.

FIG. 6 illustrates various components of a graphics processing unit 240, according to one embodiment of the present invention. As shown, GPU 240 includes a power-management microcontroller unit (PMU) 610, one or more processing cores 620, a register file 630, and code 640. The PMU 610 is configured to perform operations that configure various processing units in GPU 240. For example, PMU 610 may be configured to load values into one or more registers in register file 630. The values loaded into the registers may be accessed by a transmitter interface of communications path 280 to enable GPU 240 to transmit data over communications path 280. PMU 610 may also be configured to load a saved operating state (i.e., a processing context) for the one or more processing cores 620 by loading values into additional registers in register file 630. Although not described in detail, PMU 610 may be configured to perform other functions such as initializing a receive interface of communications path 113 or initializing one or more counters (not shown) in GPU 240.

In a normal cold-boot initialization procedure, EC 310 asserts the GPU_PWR and FB_PWR signals as well as the RESET signal, as described above in conjunction with FIG. 3, which causes the voltage regulators that provide power to GPU 240 and memory 242 to switch on. EC 310 continues to hold the RESET signal high for a short time to allow the supply voltage for the GPU 240 and memory 242 to stabilize, after which, the GPU 240 begins executing instructions as the RESET signal is pulled low by EC 310.

Once the RESET signal transitions from high to low, GPU 240 is configured to load instructions from code 640 to be executed by PMU 610. The instructions included in code 640, when executed by PMU 610, cause PMU 610 to set at least a portion of the operating state of GPU 240. Such instructions may be hardwired into the integrated circuit of GPU 240, such as a mask ROM, and may be known to those of skill in the art as a bootstrap loader. Once the instructions included in code 640 have been executed, GPU 240 may be configured to receive data and instructions from graphics driver 103 via communications path 113 that, when executed by PMU 610, cause PMU 610 to set a second portion of the operating state of GPU 240 such that GPU 240 is configured to receive graphics data and instructions from graphics driver 103 via communication path 113 and generate video signals for display on display device 110.

In conventional systems, various components of computer system 100 may be initialized in a serialized fashion during a cold-boot initialization procedure. For example, communications path 113 may be fully initialized before GPU 240 receives data and instructions from graphics driver 103 to complete the initialization of GPU 240. However, the initialization of communications path 113 may require a significant amount of time and will therefore increase the latency between the event that requires waking-up GPU 240 to generate updated pixel data and updating an image displayed on display device 110. For example, the initialization procedure for a PCIe bus may require as much as 70-100 ms to complete. Because GPU 240 cannot proceed with initialization until after the data and instructions are received from graphics driver 103 via communications path 113, GPU 240 is forced to wait until communications path 113 is fully configured.

In order to minimize the time between when the initialization procedure begins and when the GPU 240 enters a normal operating state, the initialization procedures associated with various components of computer system 100 may be executed in parallel such that initialization of GPU 240 does not need to wait until communications path 113 has been fully configured. In one embodiment, the bootstrap loader in code 640 may enable GPU 240 to communicate with EC 310 via the I2C/SMBUS. GPU 240 may then be configured to receive data and instructions from driver 340 via the I2C/SMBUS that, when executed by PMU 610, cause PMU 610 to set the second portion of the operating state of GPU 240 such that GPU 240 is configured to receive graphics data and instructions from graphics driver 103 via communication path 113 and generate video signals for display on display device 110. Thus, the initialization of GPU 240 and communications path 113 are performed substantially simultaneously.

Once GPU 240 is fully configured, GPU 240 begins to generate video signals for display on display device 110 in response to graphics primitives and instructions received from graphics driver 103. At some point during such operation, GPU 240 may request display device 110 to enter a panel self-refresh mode such that GPU 240 can enter a deep sleep state in order to minimize power consumption during extended periods of graphical inactivity. In one embodiment, graphics driver 103 may be used to store the current operating state of GPU 240 when entering a deep sleep state, such as deeper-idle state 540, while display device 110 operates in a panel self-refresh mode. For example, one or more values stored in register file 630 as well as any other configuration information that is required to fully define the current operating state of GPU 240, such as current counter values associated with each of the processing cores 620, may be read by graphics driver 103 and stored in frame buffers 244. Alternatively, such information may be stored in other volatile or non-volatile memory accessible to graphics driver 103, such as system memory 104 or system disk 114. Once the current operating state of GPU 240 is stored, GPU 240 may transition to the deep sleep state.

In one embodiment, when the image being displayed by display device 110 needs to be updated, EC 310 may cause GPU 240 to wake-up. Upon waking from the deep sleep state, GPU 240 may be configured to perform a warm-boot initialization procedure instead of a full, cold-boot initialization procedure. Similar to the cold-boot initialization procedure, the warm-boot initialization procedure begins with GPU 240 being configured to read the bootstrap loader in code 640 to be executed by PMU 610. In one embodiment, the bootstrap loader may cause PMU 610 to check the WARMBOOT signal received from EC 310. If the WARMBOOT signal is not asserted, then GPU 240 is configured via the operations described above in connection with the cold-boot initialization procedure. However, if the WARMBOOT signal is asserted, then GPU 240 is configured via a warm-boot initialization procedure. The warm-boot initialization procedure may be configured to cause PMU 610 to check SPI flash device 320 for additional data and instructions used to configure GPU 240. As described above, GPU 240 may be configured to save a current operating state, such as GPU state 660, in SPI flash device 320. Therefore, in the warm-boot initialization procedure, PMU 610 may be configured to set the operating state of GPU 240 from GPU state 660. Loading a saved operating state that represents the operating state of GPU 240 before entering the deep sleep state may advantageously reduce initialization time compared to performing a full, cold-boot initialization procedure.

In one embodiment, the warm-boot initialization procedure may be aborted if GPU 240 detects a difference in the physical configuration of computer system 100 since GPU 240 was placed in a deep sleep state. When the WARMBOOT signal is asserted, the bootstrap loader may be configured to cause PMU 610 to check GPU state 660 to determine whether the physical configuration of computer system 100 has changed. For example, GPU 240 may read registers in display device 110 to check EDID (Extended Display Identification Data) data to determine whether the display device 110 has changed since GPU 240 entered the deep sleep state. PMU 610 may then compute a checksum from the retrieved EDID data and compare the resulting value to a checksum stored in GPU state 660 that represents the EDID data associated with display device 110 before GPU 240 entered the deep sleep state. If the computed checksum matches the checksum from GPU state 660, then PMU 240 may be configured to continue to load and execute the instructions from code 650 to perform additional operations necessary to configure GPU 240. However, if the computed checksum and the checksum from GPU state 660 do not match, indicating that the physical configuration of computer system 100 may have changed, then PMU 610 may be configured to abort the warm-boot initialization procedure and perform the operations associated with a full, cold-boot initialization procedure, as described above.

In another embodiment, PMU 610 may be configured to minimize the number of updates to SPI flash device 320. As one of skill in the art would recognize, flash memory has a finite number of program-erase cycles (P/E cycles) before the integrity of the memory may be compromised. For example, many conventional flash memory devices only guarantee integrity in the stored data through 100,000 P/E cycles. If GPU 240 is configured to erase and re-program SPI flash device 320 every time GPU 240 was placed in a deep sleep state, SPI flash device 320 may eventually become unstable and GPU state 660 or code 650 may become corrupt. Therefore, when entering a deep sleep state, GPU 240 may be configured to determine whether the current operating state of GPU 240 matches the operating state associated with GPU state 660. If the current operating state matches the operating state associated with GPU state 660, then GPU 240 may be configured to enter the deep sleep state without updating SPI flash device 320. However, if the current operating state does not match the operating state associated with GPU state 660, then GPU 240 may re-program SPI flash device 320 such that the GPU state 660 reflects the current operating state of GPU 240. Thus, the finite number of P/E cycles of SPI flash device 320 is not exhausted prematurely, and the life expectancy of SPI flash device 320 may be extended beyond the expected life of computer system 100.

In yet another embodiment, code 650 may include a compression-decompression software (codec) that, when executed by PMU 610, enables PMU 610 to encode or decode instruction or data in SPI flash device 320. Memory requirements for storing code 650 and GPU state 660 may be quite large, such as 10-20 kilobytes (kB) or more. A large portion of the time required to perform the operations associated with the warm-boot initialization procedure may be as a result of data transfer via an interface connecting the SPI flash device 320 and GPU 240. In order to minimize the amount of data transferred over this interface, GPU 240 may be configured to store code 650 or GPU state 660 in a compressed format.

In such embodiments, prior to storing the current operating state of GPU 240, PMU 610 may be configured to load the codec included in code 650 from the SPI flash device 320. In other embodiments, the codec may be hardwired directly in GPU 240. PMU 610 may then write GPU state 660 to the SPI flash device 320 in a compressed format. When EC 310 causes GPU 240 to exit the deep sleep state, PMU 610 may execute the bootstrap loader and load the codec from code 650 or an on-chip memory. GPU 240 may then restore GPU 240 to the operating state associated with compressed GPU state 660 in the SPI flash device 320. For example, PMU 610 may read GPU state 660 from SPI flash device 320, decode GPU state 660, and load data from the uncompressed version of GPU state 660 into register file 630 or other memory associated with GPU 240. In one embodiment, the codec may use run-length encoding to compress GPU state 660. In other embodiments, the codec may use any other technically feasible compression algorithm known in the art.

Figure 7:
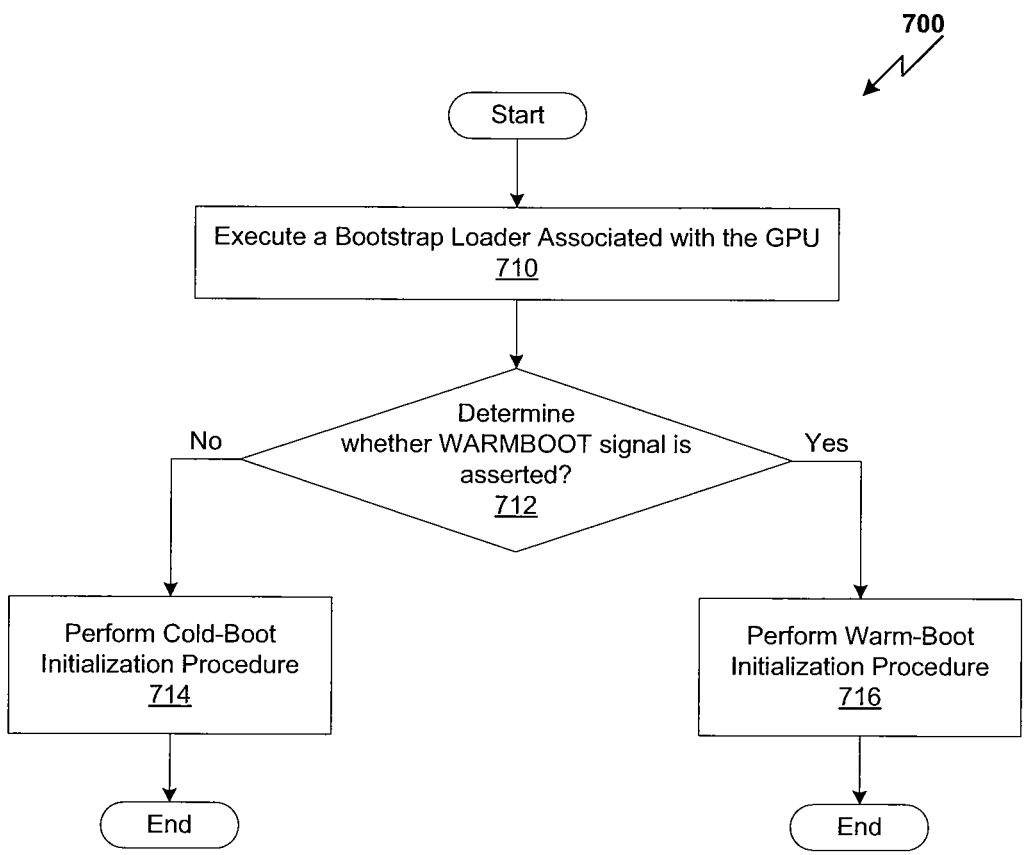
FIG. 7 sets forth a flowchart of a method for configuring a graphics processing unit, according to one embodiment of the present invention.

FIG. 7 sets forth a flowchart of a method 700 for configuring a graphics processing unit 240, according to one embodiment of the present invention. Although the method steps are described in conjunction with the systems of FIGS. 1, 2A-2D and 3-6, persons skilled in the art will understand that any system configured to perform the method steps, in any order, is within the scope of the invention.

The method begins at step 710, where GPU 240 executes a bootstrap loader stored in memory associated with the GPU. In one embodiment, the bootstrap loader is included in code 640 and is hardwired into the integrated circuit of GPU 240. The bootstrap loader may configure GPU 240 to load and execute additional instructions received from graphics driver 103 or SPI flash device 320. At step 712, GPU 240 determines whether a WARMBOOT signal is asserted by EC 310. As described above in connection with FIG. 3, the WARMBOOT signal indicates whether GPU 240 should perform a fast resume operation such as a warm-boot initialization procedure. If the WARMBOOT signal is not asserted, then method 700 proceeds to step 714 where GPU 240 performs a full, cold-boot initialization procedure. In one embodiment, GPU 240 receives data and instructions from graphics driver 103 via communications path. 113. In alternative embodiments, GPU 240 receives data and instructions from driver 340 via the I2C/SMBUS connecting GPU 240 to EC 310. GPU 240 configures an operating state of GPU 240 based on the data and instructions received from the software driver. Returning now to step 712, if the WARMBOOT signal is asserted, then method 700 proceeds to step 716 where GPU 240 performs a fast resume, warm-boot initialization procedure. In one embodiment, GPU 240 is configured to load data and instructions from a dedicated, non-volatile memory coupled to GPU 240 such as SPI flash device 320. GPU 240 configures an operating state of GPU 240 based on the data and instructions received from the non-volatile memory.

Figure 8:
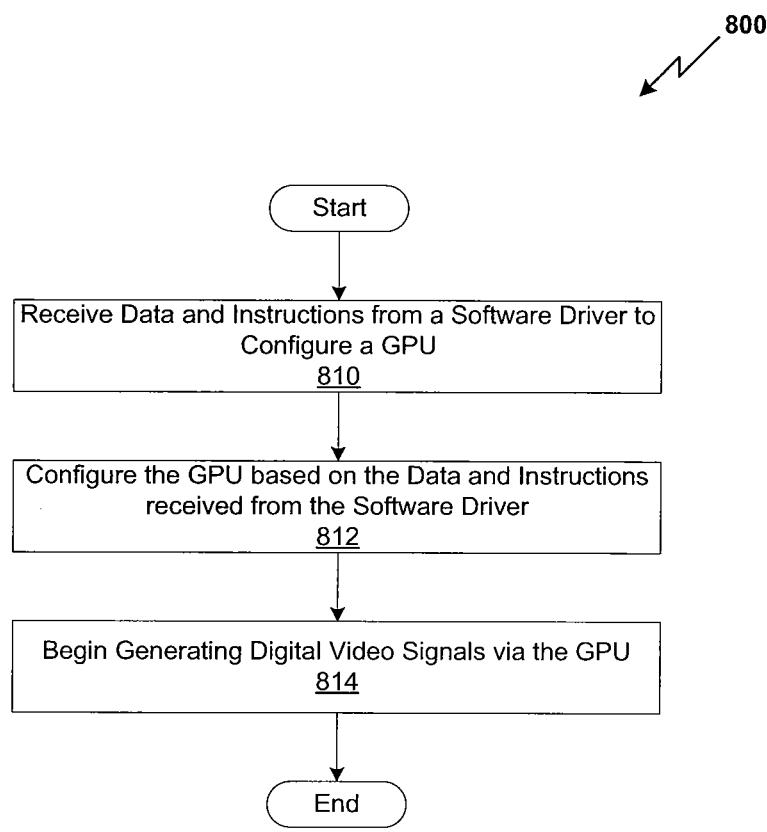
FIG. 8 sets forth a flowchart of a method for performing a full, cold-boot initialization procedure for a graphics processing unit, according to one embodiment of the present invention.

FIG. 8 sets forth a flowchart of a method 800 for performing a cold-boot initialization procedure for a graphics processing unit 240, according to one embodiment of the present invention. Although the method steps are described in conjunction with the systems of FIGS. 1, 2A-2D and 3-6, persons skilled in the art will understand that any system configured to perform the method steps, in any order, is within the scope of the invention.

The method begins at step 810, where GPU 240 receives data and instructions from a software driver to set an operating state of the GPU 240. In one embodiment, GPU 240 receives the data and instructions from graphics driver 103 via communications path 113. In such embodiments, GPU 240 must wait until communications path 113 is fully initialized by computer system 100 before GPU 240 can receive the data and instructions from graphics driver 103. In alternative embodiments, GPU 240 may receive data and instructions from driver 340 via an I2C/SMBUS connecting GPU 240 to EC 310. In such embodiments, the cold-boot initialization procedure can proceed in parallel with the initialization of other hardware components of computer system 100 such as communications path 113. At step 812, GPU 240 may route the instructions to PMU 610 for execution. The executed instructions may be configured to set an operating state of GPU 240, such as by writing values defined in the received data to registers in register file 630. The executed instructions may cause PMU 610 to configure other aspects of GPU 240 as well, such as initializing one or more counters associated with GPU 240. At step 814, GPU 240 begins to generate digital video signals for display on display device 110. GPU 240 may be configured to process graphics primitives received from graphics driver 103 to generate shaded pixel data stored in frame buffers 244. GPU 240 may then generate the digital video signals based on the shaded pixel data in frame buffers 244 and method 800 terminates.

Figure 9:
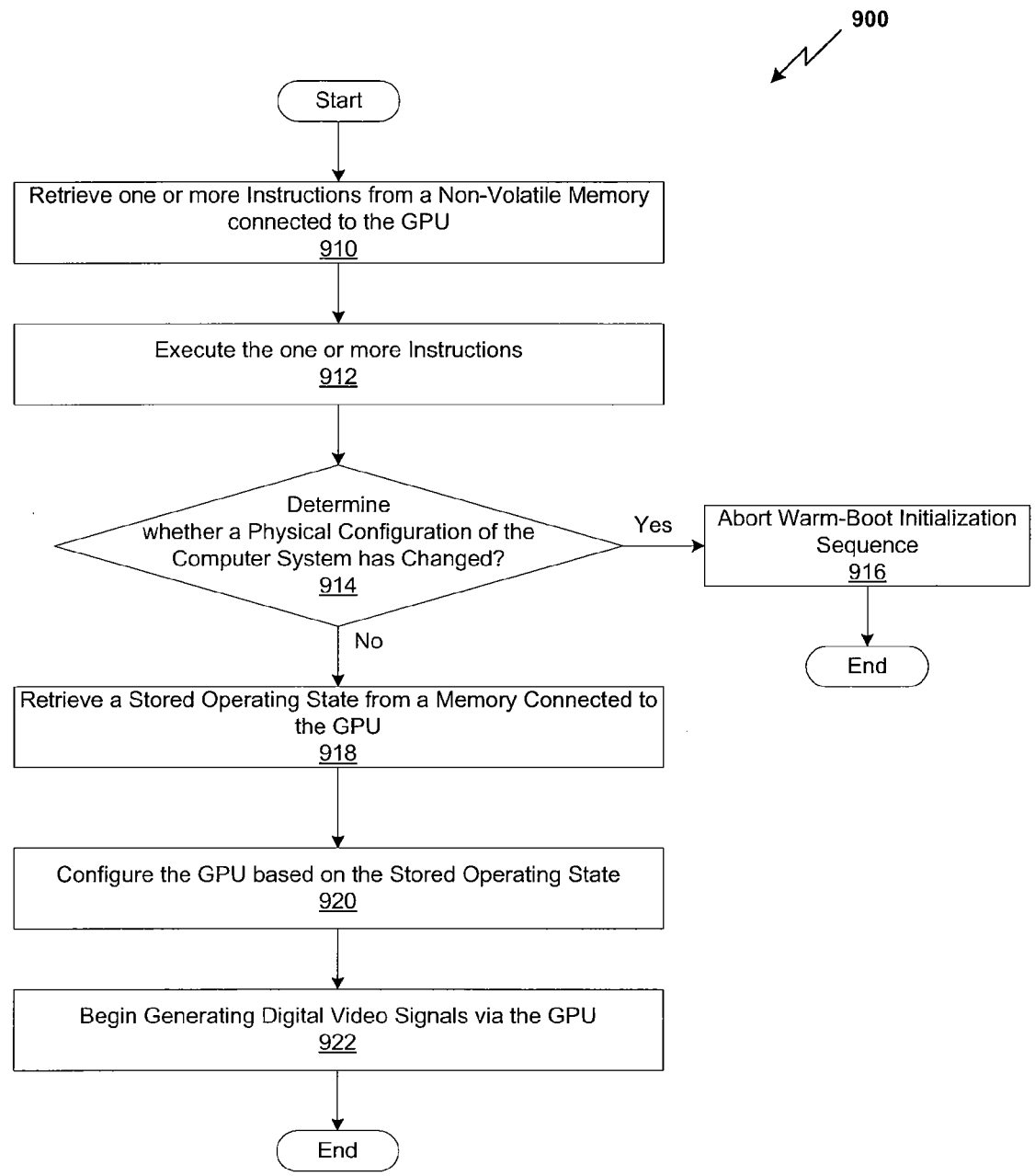
FIG. 9 sets forth a flowchart of a method for performing a fast resume, warm-boot initialization procedure for a graphics processing unit, according to one embodiment of the present invention.

FIG. 9 sets forth a flowchart of a method 900 for performing a fast resume, warm-boot initialization procedure for a graphics processing unit 240, according to one embodiment of the present invention. Although the method steps are described in conjunction with the systems of FIGS. 1, 2A-2D and 3-6, persons skilled in the art will understand that any system configured to perform the method steps, in any order, is within the scope of the invention.

The method begins at step 910, where GPU 240 retrieves one or more instructions from non-volatile memory connected to GPU 240. In one embodiment, the one or more instructions may be retrieved from code 650 in SPI flash device 320 and configured to cause GPU 240 to perform one or more operations in the warm-boot initialization procedure, such as determining a location in SPI flash device 320 where a GPU state 660 is stored. In alternative embodiments, the one or more instructions may be hard-wired into on-chip ROM within GPU 240. At step 912, GPU 240 executes the one or more instructions retrieved from non-volatile memory. At step 914, GPU 240 determines whether the physical configuration of computer system 100 has changed since GPU 240 entered a deep sleep state. For example, GPU 240 could be configured to check whether a new display has been connected to computer system 100. In one embodiment, GPU 240 may read a checksum value stored in SPI flash device 320 that is related to a previous physical configuration of computer system 100 when GPU 240 entered the deep sleep state. GPU 240 may then calculate a checksum value related to a current physical configuration of computer system 100 as GPU 240 exits the deep sleep state. If the stored checksum value matches the calculated checksum value, then GPU 240 determines that the physical configuration of computer system 100 has not changed, and method 900 proceeds to step 918. However, if the stored checksum value does not match the calculated checksum value, then GPU 240 determines that the physical configuration of computer system 100 has changed, and method 900 proceeds to step 916 where GPU 240 aborts the warm-boot initialization procedure and performs a full cold-boot initialization procedure, such as the initialization procedure described above in connection with method 800.

Returning now to step 918, GPU 240 retrieves a stored operating state from a memory connected to GPU 240. In one embodiment, the instructions retrieved in step 910 are configured to cause PMU 610 to load GPU state 660 from SPI flash device 320. In alternative embodiments, GPU state 660 may be loaded from other memory such as frame buffers 244 or system memory 104. At step 920, GPU 240 may set the current operating state of GPU 240 to reflect the stored operating state retrieved from non-volatile memory. In one embodiment, PMU 610 is configured to read the stored operating state from SPI flash device 320 and write one or more values associated with the stored operating state to one or more registers in register file 630. At step 922, GPU begins to generate digital video signals for display on display device 110. GPU 240 may be configured to process graphics primitives received from graphics driver 103 to generate shaded pixel data stored in frame buffers 244. GPU 240 may then generate the digital video signals based on the shaded pixel data in frame buffers 244 and method 900 terminates.

In sum, the disclosed technique manages the configuration of a graphics processing unit coupled to a display device that has a self-refresh capability. The technique utilizes a full, cold-boot initialization procedure when the computer system is powered on initially. In addition, the technique will use the cold-boot initialization procedure when the graphics processing unit detects that the physical configuration of the computer system has changed when exiting a deep sleep state. Alternatively, when the graphics processing unit is exiting a deep sleep state and when the physical configuration of the computer system has not changed, the technique uses a condensed, warm-boot initialization procedure that restores a previously saved operating state in order to minimize the configuration time required after exiting the deep sleep state.

One advantage of the disclosed technique is that minimizing the configuration time for a graphics processing unit may decrease latency associated with updating an image being displayed while the display device is operating in a panel self-refresh mode. A computer system that includes a display device having a self-refresh capability may frequently cause a graphics processing unit to enter and exit a deep sleep state. Many times, the graphics processing unit will exit the deep sleep state within a few seconds of entering the deep sleep state. Therefore, it is very unlikely that the configuration of the computer system has changed since the graphics processing unit entered the deep sleep state. The disclosed technique exploits this fact by saving and loading the operating state of the graphics processing unit rather than relying on the graphics driver to configure the graphics processing unit each time the power for the graphics processing unit is switched on.

Another advantage of the disclosed technique is that the graphics processing unit may be configured in parallel with other hardware and software components of the computer system. Utilizing an auxiliary communications path or a dedicated, non-volatile memory to load instructions used to configure the graphics processing unit relieves the graphics processing unit from being dependent on the successful initialization of a high speed communications bus, such as the PCIe bus, before the configuration of the graphics processing unit can proceed. Enabling the graphics processing unit to be configured independently reduces the time required for initialization and provides a better user experience.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method for setting the operating state for a graphics processing unit coupled to a self-refreshing display device, the method comprising:

performing at least one operation to set a first portion of the operating state for the graphics processing unit;
determining whether a signal has been asserted indicating that the graphics processing unit should perform a warm-boot operation; and
if the signal has been asserted, then performing the warm-boot operation to set a second portion of the operating state for the graphics processing unit, or
if the signal has not been asserted, then performing a cold-boot operation to set the second portion of the operating state for the graphics processing unit.

2. The method of claim 1, wherein an instruction for performing the at least one operation is stored in a mask ROM associated with the graphics processing unit.

3. The method of claim 1, wherein performing the cold-boot operation comprises:
receiving one or more values generated by a software driver associated with the graphics processing unit via a secondary communication bus;
loading the one or more values into one or more registers associated with the graphics processing unit; and
setting the second portion of the operating state for the graphics processing unit to enable the graphics processing unit to receive graphics data and instructions via a primary communication bus and to generate video signals based on the graphics data and the instructions for display on the display device.

4. The method of claim 3, wherein receiving the one or more values is performed while the primary communication bus is being initialized.

5. The method of claim 1, wherein performing the warm-boot operation comprises:
reading one or more values from a non-volatile memory coupled to the graphics processing unit;
loading the one or more values into one or more registers associated with the graphics processing unit; and
setting the second portion of the operating state for the graphics processing unit to enable the graphics processing unit to receive graphics data and instructions via a primary communication bus and to generate video signals based on the graphics data and the instructions for display on the display device.

6. The method of claim 5, wherein the non-volatile memory comprises a flash memory device.

7. The method of claim 6, further comprising:
prior to entering a deep sleep state, determining whether a stored operating state of the graphics processing unit in the non-volatile memory matches a current operating state of the graphics processing unit; and
if the stored operating state matches the current operating state, then entering the deep sleep state, or
if the stored operating state does not match the current operating state, then updating the stored operating state to reflect the current operating state and entering the deep sleep state.

8. The method of claim 7, wherein the step of determining whether a stored operating state of the graphics processing unit in the non-volatile memory matches a current operating state of the graphics processing unit comprises comparing a hash value related to the stored operating state to a hash value related to the current operating state.

9. A sub-system comprising:
a graphics processing unit configured to:
perform at least one operation to set a first portion of the operating state for the graphics processing unit;
determine whether a signal has been asserted indicating that the graphics processing unit should perform a warm-boot operation; and
if the signal has been asserted, then perform the warm-boot operation to set a second portion of the operating state for the graphics processing unit, or
if the signal has not been asserted, then perform a cold-boot operation to set the second portion of the operating state for the graphics processing unit.

10. The sub-system of claim 9, wherein an instruction for performing the at least one operation is stored in a mask ROM associated with the graphics processing unit.

11. The sub-system of claim 9, wherein performing the cold-boot operation comprises:
receiving one or more values generated by a software driver associated with the graphics processing unit via a secondary communication bus;
loading the one or more values into one or more registers associated with the graphics processing unit; and
setting the second portion of the operating state for the graphics processing unit to enable the graphics processing unit to receive graphics data and instructions via a primary communication bus and to generate video signals based on the graphics data and the instructions for display on the display device.

12. The sub-system of claim 11, wherein receiving the one or more values is performed while the primary communication bus is being initialized.

13. The sub-system of claim 9, wherein performing the warm-boot operation comprises:
reading one or more values from the non-volatile memory;
loading the one or more values into one or more registers associated with the graphics processing unit; and
setting the second portion of the operating state for the graphics processing unit to enable the graphics processing unit to receive graphics data and instructions via a primary communication bus and to generate video signals based on the graphics data and the instructions for display on the display device.

14. The sub-system of claim 13, wherein the non-volatile memory comprises a flash memory device.

15. The sub-system of claim 14, the graphics processing unit further configured to:
prior to entering a deep sleep state, determine whether a stored operating state of the graphics processing unit in the non-volatile memory matches a current operating state of the graphics processing unit; and
if the stored operating state matches the current operating state, then entering the deep sleep state, or
if the stored operating state does not match the current operating state, then updating the stored operating state to reflect the current operating state and entering the deep sleep state.

16. The sub-system of claim 15, wherein the step of determining whether a stored operating state of the graphics processing unit in the non-volatile memory matches a current operating state of the graphics processing unit comprises comparing a hash value related to the stored operating state to a hash value related to the current operating state.

17. A computing device comprising:
a sub-system that includes a graphics processing unit configured to:
perform at least one operation to set a first portion of the operating state for the graphics processing unit;
determine whether a signal has been asserted indicating that the graphics processing unit should perform a warm-boot operation; and if the signal has been asserted, then perform the warm-boot operation to set a second portion of the operating state for the graphics processing unit, or if the signal has not been asserted, then perform a cold-boot operation to set the second portion of the operating state for the graphics processing unit.

18. The computing device of claim 17, wherein performing the cold-boot operation comprises:

receiving one or more values generated by a software driver associated with the graphics processing unit via a secondary communication bus;

loading the one or more values into one or more registers associated with the graphics processing unit; and setting the second portion of the operating state for the graphics processing unit to enable the graphics processing unit to receive graphics data and instructions via a primary communication bus and to generate video signals based on the graphics data and the instructions for display on the display device.

19. The computing device of claim 17, wherein performing the warm-boot operation comprises:

reading one or more values from a non-volatile memory coupled to the graphics processing unit;

loading the one or more values into one or more registers associated with the graphics processing unit; and setting the second portion of the operating state for the graphics processing unit to enable the graphics processing unit to receive graphics data and instructions via a primary communication bus and to generate video signals based on the graphics data and the instructions for display on the display device.

20. The computing device of claim 17, the graphics processing unit further configured to:

prior to entering a deep sleep state, determine whether a stored operating state of the graphics processing unit in the non-volatile memory matches a current operating state of the graphics processing unit by comparing a hash value related to the stored operating state to a hash value related to the current operating state; and if the stored operating state matches the current operating state, then entering the deep sleep state, or if the stored operating state does not match the current operating state, then updating the stored operating state to reflect the current operating state and entering the deep sleep state.

* * * * *